US008269763B2

(12) United States Patent
Singer (10) Patent No.: US 8,269,763 B2
(45) Date of Patent: Sep. 18, 2012

(54) CONTINUOUS RANDOM ACCESS POINTS

(75) Inventor: David William Singer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1085 days.

(21) Appl. No.: 11/731,757

(22) Filed: Mar. 30, 2007

(65) Prior Publication Data
US 2008/0106548 A1    May 8, 2008

Related U.S. Application Data

(60) Provisional application No. 60/856,561, filed on Nov. 3, 2006.

(51) Int. Cl.
*G06T 17/00* (2006.01)
(52) U.S. Cl. ......... 345/419; 382/232; 709/230; 370/394
(58) Field of Classification Search ........................ None
See application file for complete search history.

(56) References Cited

U.S. PATENT DOCUMENTS

| | | | | |
|---|---|---|---|---|
| 6,055,246 A * | 4/2000 | Jones | | 370/503 |
| 6,243,856 B1 * | 6/2001 | Meyer et al. | | 717/146 |
| 7,020,587 B1 * | 3/2006 | Di et al. | | 703/2 |
| 7,027,443 B2 * | 4/2006 | Nichols et al. | | 370/394 |
| 7,302,464 B2 * | 11/2007 | Kim et al. | | 709/203 |
| 7,366,986 B2 * | 4/2008 | Lee | | 715/716 |
| 7,439,982 B2 * | 10/2008 | Deniau et al. | | 345/581 |
| 8,019,883 B1 * | 9/2011 | Margulis | | 709/231 |
| 8,095,957 B2 * | 1/2012 | Cotarmanac'h | | 725/116 |
| 2002/0024952 A1 * | 2/2002 | Negishi et al. | | 370/394 |
| 2002/0069218 A1 * | 6/2002 | Sull et al. | | 707/501.1 |
| 2003/0028901 A1 * | 2/2003 | Shae et al. | | 725/146 |
| 2005/0182844 A1 * | 8/2005 | Johnson et al. | | 709/230 |
| 2005/0254498 A1 * | 11/2005 | Itoh | | 370/394 |
| 2006/0143509 A1 * | 6/2006 | Okawa | | 714/11 |
| 2007/0028190 A1 * | 2/2007 | Stachfield | | 715/854 |
| 2007/0153914 A1 * | 7/2007 | Hannuksela et al. | | 375/240.26 |
| 2008/0019371 A1 * | 1/2008 | Anschutz et al. | | 370/394 |

OTHER PUBLICATIONS

Nokia and Ericsson, "MORE Technical Proposal for Dynamic and Interactive Multimedia Scenes (DIMS)," 3GPP TSG-SA WG4 Meeting #39, May 15-19, 2006, Dallas, USA.
Apple Computer, "On the DIMS specification," 3GPP TSG-SA WG4 Meeting #39, Aug. 28-Sep. 1, 2006, Sophia Antipolis, FR.

\* cited by examiner

*Primary Examiner* — Ulka Chauhan
*Assistant Examiner* — Andrew G Yang
(74) *Attorney, Agent, or Firm* — Kenyon & Kenyon LLP (57) ABSTRACT

Techniques for providing a refresh of a scene are disclosed. In some embodiments, a scene is divided into a plurality of fragments, and successive fragments comprising the plurality of fragments are transmitted in a refresh stream. In such cases, each fragment comprises a subset that includes fewer than all of a hierarchical set of nodes comprising the scene and provides less than a complete structure of the scene. The nodes included in the respective successive fragments and the number of fragments into which the scene is divided are such that a prescribed number of consecutive fragments starting from any point in the refresh stream provides sufficient data to refresh the scene.

52 Claims, 6 Drawing Sheets

CONTINUOUS RANDOM ACCESS POINTS

CROSS REFERENCE TO OTHER APPLICATIONS

This application claims priority to U.S. Provisional Patent Application No. 60/856,561 entitled "On Random Access and Error Recovery in DIMS" filed Nov. 3, 2006, which is incorporated herein by reference for all purposes.

BACKGROUND OF THE INVENTION

In some implementations of scalable vector graphics (SVG) and similar protocols used to encode and transmit video or other multimedia data, e.g., via a network, a "refresh" data is supplied periodically so that a client can recover from an error state or tune-in at a random access point. If such a refresh data were not available, the client may not be able to recover as a result of not having the initial data or "scene" as a starting point to which to apply updates provided in a stream at subsequent points. Such refresh data may consume a significant amount of bandwidth, depending on how frequently it is sent. Moreover, since such a refresh is only periodically provided, a client must wait for a periodically available synchronization point. It would be useful to provide the data associated with a refresh using less bandwidth. It would also be useful to provide continuous access points so that a refresh can be commenced at any point in time.

Thus, there is a need for an improved manner to provide a refresh.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for providing a refresh of a scene are disclosed. In some embodiments, a scene is divided into a plurality of fragments, and successive fragments comprising the plurality of fragments are transmitted in a refresh stream. In such cases, each fragment comprises a subset that includes fewer than all of a hierarchical set of nodes comprising the scene and provides less than a complete structure of the scene. The nodes included in the respective successive fragments and the number of fragments into which the scene is divided are such that a prescribed number of consecutive fragments starting from any point in the refresh stream provides sufficient data to refresh the scene.

Figure 1:
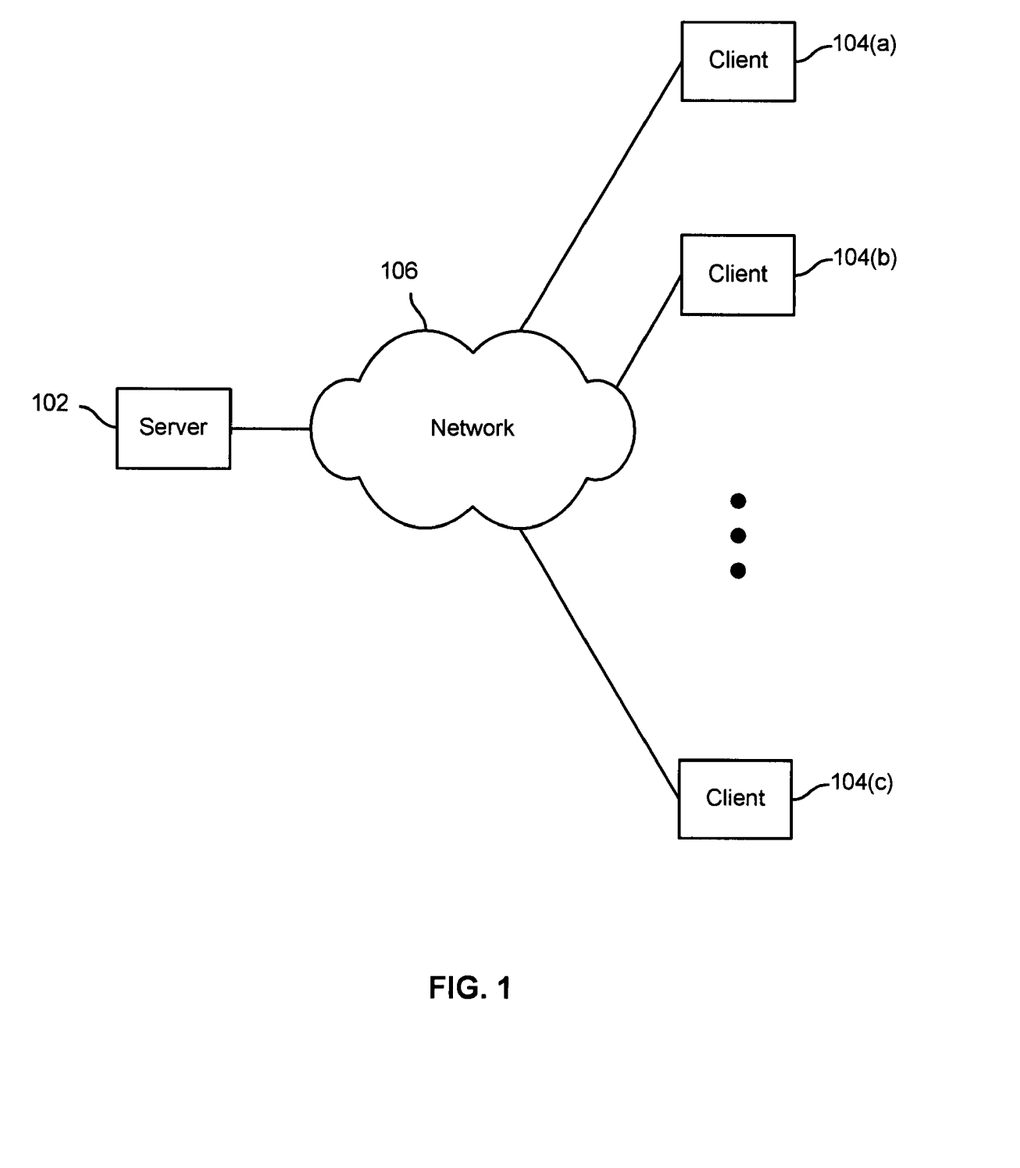
FIG. 1 illustrates an embodiment of a network environment in which content is provided by a server to one or more clients.

FIG. 1 illustrates an embodiment of a network environment in which content is provided by a server to one or more clients. As depicted in the given example, the transmission of content from server 102 to clients 104 is facilitated by a network 106. Network 106 may be any internal or external network, such as a LAN, WAN, the internet, etc. In various embodiments, server 102 may provide static and/or dynamic content. In some embodiments, server 102 provides a live stream of data associated with a scene. In some embodiments, a scene is implemented using SVG (Scalable Vector Graphics) and includes one or more objects, one or more of which may be associated with an action when selected. In some embodiments, the structure of a scene can be represented by a hierarchical object tree. In the cases in which at least parts of a scene are dynamic and/or interactive, in some embodiments, an initial scene is initially supplied by server 102 and updates to dynamic portions of the scene are provided via an update stream. In various embodiments, an update may include instructions to add content to a scene, delete content from a scene, replace content of a scene, change one or more attribute values associated with a scene, etc. In some embodiments, one or more updates provided for a scene are based at least in part on interaction with the scene at the client-side.

If a client receives an initial scene as well as all updates to the initial scene via an update stream from an associated server, the scene can be dynamically rendered at the client-side. However, if a communication channel between the server and client is unreliable and as a result one or more updates are not received by the client, the client may enter into an error state and need a refresh of the scene from the server to properly continue rendering the scene. In some embodiments, it may be possible for a client to tune-in to a live stream of data associated with a scene while it is in progress. In such cases, the client will not have the initial scene provided by the server as well as updates prior to tune-in and thus will not have the data needed to render the scene or process any subsequent updates received via an update stream. Thus, in the cases where a client is recovering from an error state and/or a client tunes-in to a live stream of data at a random access point without having an associated initial scene and any updates prior to tune-in, a refresh of the current state of the scene is needed from the server to render the scene at the client-side.

An existing solution for error recovery and/or providing random access points includes periodically supplying a refresh of a current state of the scene, e.g., by supplying a current scene that reflects the associated initial scene with all intervening updates up to that point in time applied. Such a refresh of the entire scene allows a client to periodically recover from error, if needed, and/or periodically tune-in to a live stream, e.g., by picking up from the refresh scene and applying to that scene updates received subsequently. If a scene is complicated, however, periodically supplying such a refresh of a current state of the scene may consume a significant amount of bandwidth, especially relative to the bandwidth required to supply a corresponding update stream. Thus, in many cases, it is not optimal to periodically supply a full refresh. A full refresh could in some cases be supplied less frequently, but such an approach would result in longer error recovery times and/or longer waits to tune-in to a stream.

In other existing solutions for error recovery and/or providing random access points, the bandwidth issues associated with periodically providing full refreshes of a scene are mitigated by periodically providing only partial refreshes of the scene. A partial refresh of a scene includes only the portions of the scene that are static at least within the time frame required to complete a full refresh of the scene. In a technique known in the art as DRAP (Distributed Random Access Points), a partial refresh of a scene is periodically supplied that includes static portions of the scene and that includes forward pointers to dynamic portions of the scene that are supplied in subsequent updates. The forward pointers point to data in subsequent updates and all must be resolved in order to build the entire scene and complete the refresh. In such cases, normal update processing is ceased until the entire scene is reconstructed by replacing the forward pointers with their corresponding data. In a technique known in the art as RRAP (Rolling Random Access Points), a partial refresh of a scene is periodically supplied that includes static portions of the scene and that includes placeholders for dynamic portions of the scene that are supplied in subsequent updates. The placeholders signify portions of the scene that are incomplete and must be all resolved to complete the scene. In RRAP, normal update processing is employed to replace the placeholders with data received in subsequent updates and complete a full refresh of the scene. Thus, in the DRAP and RRAP cases, the parts of a scene that are provided in updates within an interval over which error recovery and/or tune-in is desirable are leveraged to complete a full refresh so that the periodically supplied partial refreshes of a scene can be of smaller size. The DRAP and RRAP techniques provide improvements over the technique of periodically supplying full refreshes in the cases in which a scene is highly dynamic since in such cases the periodically provided partial refreshes are smaller than a full refresh and do not consume much bandwidth. However, in the cases in which the partial refreshes provided with the DRAP and RRAP techniques are large, these techniques face similar bandwidth concerns as periodically providing a full refresh of a scene. If a large portion of a scene is not dynamic or in particular is not dynamic in the upcoming interval over which error recovery or tune-in is desirable, the DRAP and RRAP techniques provide little improvement.

It would be useful to more efficiently provide refreshes of a scene. It would further be useful if a refresh of a scene is continuously provided so that a client can start tuning-in or recovering from an error state at any point in time. These and other improvements are described in detail below.

A server, such as server 102 of FIG. 1, supplying a dynamic scene initially transmits an initial scene and then begins transmitting an update stream that includes updates to the scene as well as a refresh stream for error recovery and random tune-in. In some embodiments, a refresh stream comprises a stream of refresh fragments, each of which represents the current or near current state of a portion of a scene. In some such cases, a prescribed number of consecutive refresh fragments are needed to reconstruct the current state of a scene at a client, such as client 104 of FIG. 1. The number of consecutive refresh fragments needed to reconstruct or fully refresh a scene is sometimes referred to herein as the "refresh distance". Thus, instead of periodically transmitting an entire or a very large (e.g., static) portion of a scene in the refresh stream, dividing a scene into fragments and sequentially transmitting the fragments in the refresh stream can be employed to provide to a client a refresh of a scene without significantly increasing bandwidth requirements. When selecting a refresh distance, a trade-off between error recovery or tune-in time and bandwidth is made since decreasing the recovery or tune-in time (i.e. the refresh distance) increases the bandwidth needed to supply a complete refresh and vice versa. Since the nodes comprising a scene are periodically transmitted in a continuous stream of refresh fragments, a client can begin recovering from an error state and/or tune-in at any point in time. A full refresh can be achieved upon receiving a number of consecutive refresh fragments equivalent to the refresh distance.

Figure 2A:
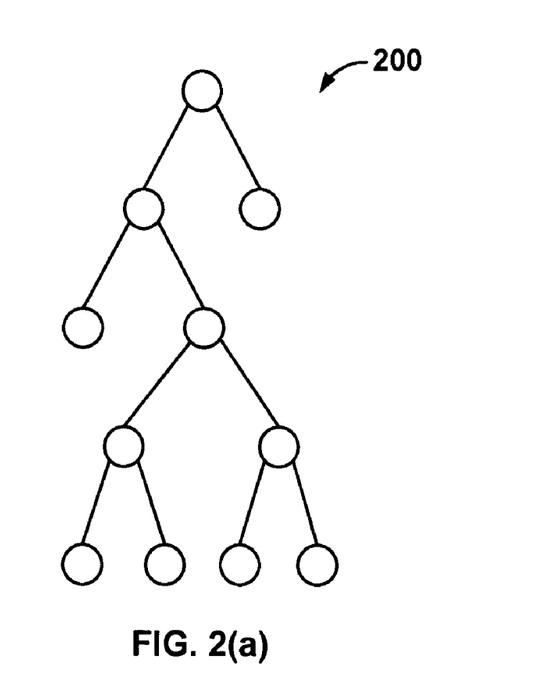
FIG. 2(a) illustrates an embodiment of a scene.
Figure 2B:
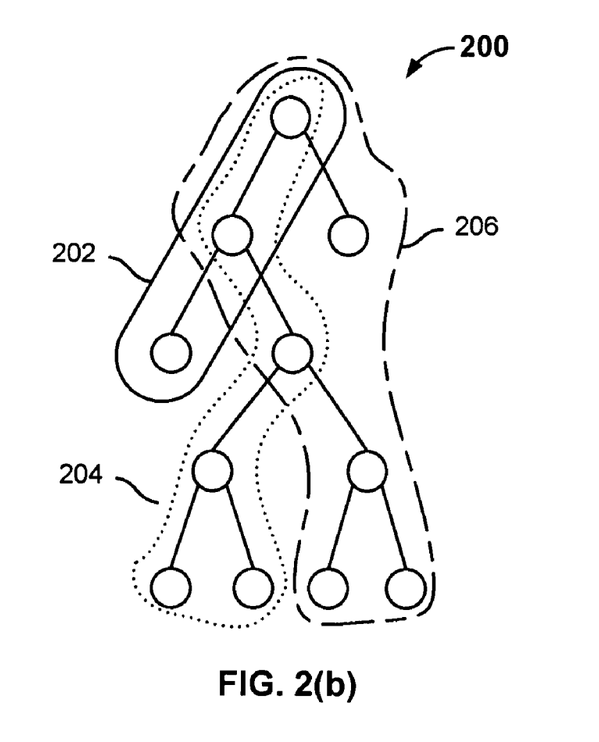
FIG. 2(b) illustrates an embodiment of a manner in which the scene of FIG. 2(a) can be divided into a plurality of fragments.

FIG. 2(a) illustrates an embodiment of a scene. As depicted, a scene can be represented and stored in memory using a hierarchical tree 200 of nodes. In various embodiments, the nodes comprising a scene comprise objects or any other appropriate data or data structure associated with a hierarchical scene. Tree 200 represents the state of a scene at a particular instance in time. Tree 200 may evolve over time as one or more nodes are added, deleted, replaced, etc., and/or one or more attribute values associated with one or more nodes are modified. FIG. 2(b) illustrates an embodiment of a manner in which the scene of FIG. 2(a) can be divided into a plurality of fragments. In the given example, tree 200 is divided into three fragments: 202, 204, and 206. Tree 200 is divided in a way such that each fragment includes the parent nodes of all nodes included in the fragment. Since a scene is built at a client from its fragments, each fragment needs to include the parent of each node included in the fragment so that the nodes included in the fragment can be correctly positioned in the tree instantiated at the client. The root of the tree, consequently, is included in each fragment. The fragments of tree 200 are successively transmitted in a refresh stream so that the scene can be constructed or refreshed at a client if needed. In some embodiments, the refresh distance is specified with each refresh fragment to inform a client of the number of consecutive refresh fragments that need to be accumulated to complete a refresh. If a refresh distance of three is selected for the given example, each fragment 202-206 is transmitted with a maximum period of three to satisfy the refresh distance.

In various embodiments, the refresh distance is a static value, a preconfigured value, a relatively static value configurable by a user to meet the user's needs and/or match the type of content being transmitted, and/or an at least partly dynamically determined value, e.g., based on a human or automated assessment of the content being transmitted, such as the size of the scene, the proportion of the scene that is static, etc.

The division of tree 200 into fragments in FIG. 2(*b*) illustrates one embodiment of a manner in which the nodes of a scene at a particular instance in time may be divided and included in refresh fragments in a refresh stream. Since a scene may evolve over time as nodes are added, deleted, replaced, etc., the number and/or boundaries of fragments that divide a scene may correspondingly evolve over time. In some embodiments, each node of a scene is associated with a counter at the server-side that tracks the age of the node. The age of a node specifies the number of refresh fragments that have been transmitted since the node was last transmitted in a refresh fragment. The age of a node is reset to one each time the node is transmitted in a refresh fragment. The ages of nodes may be employed, for example, to determine the sequence in which to transmit sets of nodes in refresh fragments and to ensure that each node of a scene is transmitted within a prescribed refresh distance.

For example, with respect to FIG. 2(*b*), consider that a refresh distance of three is selected and the nodes in fragments 202, 204, and 206, are consecutively transmitted. When the nodes included in fragment 202 are transmitted, the age of each node included in fragment 202 is reset to one. The nodes included in fragment 204 are transmitted next. The age of each node included in fragment 204 is reset to one, and the age of each node included in fragment 202 is incremented to two. The nodes included in fragment 206 are transmitted next. The age of each node included in fragment 206 is reset to one, the age of each node included in fragment 204 is incremented to two, and the age of each node included in fragment 202 is incremented to three. In order to satisfy the prescribed refresh distance of three, the nodes included in fragment 202 are included in the next refresh fragment, and their ages are reset to one. Thus, tracking the age of each node of a scene at the server-side aids in determining the order in which to transmit the nodes in a stream of refresh fragments such that a prescribed refresh distance is satisfied.

One or more nodes may be added to a scene. As a result, by the time of the second or subsequent sending of the nodes included in fragment 202 in the example above, additional nodes may have been added to the tree. In some embodiments, nodes having a nearest parent (or grandparent, etc.) node included previously in a fragment as a lowest level node in that fragment are added to that fragment when the fragment is sent subsequently. In some embodiments, the foregoing is achieved by giving added child nodes the same age as their parent. In some embodiments, the boundaries and/or number of fragments may change over time, e.g., to keep the fragments roughly the same size as each other and/or to achieve some desired fragment size. In some embodiments, each added node inherits the age of its direct parent, which ensures that an added node is included in a subsequent refresh fragment, within the prescribed refresh distance, even if the fragment boundaries move.

Since the parents of all nodes included in a refresh fragment need to be also included in that refresh fragment so that children nodes can be properly instantiated at a client during a refresh, nodes that are higher up in a tree are more frequently refreshed, and the root of the tree is refreshed in each refresh fragment. In various embodiments, one or more nodes of a scene may be refreshed prior to reaching their maximum allowable age, i.e. the prescribed refresh distance. For example, nodes higher up in a tree that are refreshed more frequently may be refreshed prior to reaching their maximum allowable age. In some cases, if it can be determined in advance that a large number of nodes will need to be refreshed in an upcoming refresh fragment to satisfy the refresh distance guaranteed to a client, for example, due to a significant update to an associated scene, one or more of the nodes may be refreshed earlier in one or more prior refresh fragments (i.e. before reaching their maximum allowable age) so that a large amount of bandwidth is not expended in transmitting all of the nodes in the same refresh fragment. In some embodiments, the sets of nodes to be included in refresh fragments may be selected in a manner that ensures that the refresh fragments are of approximately the same size so that, for example, a smooth data rate for the refresh stream can be achieved.

In some embodiments, each node is assigned an ordering number so that when a tree is reconstructed at a client during a refresh, the children of each node can be ordered by ordering number. For example, the ordering number of a node may take the form "n/m". Such an ordering number format specifies that a node is child "n" of "m" children and provides a consistency check when the tree is reconstructed. In other cases, the ordering number of a node may take the form "n" and the associated number space may be sparse. For instance, such an ordering number may signify that an associated node comes after all children with an ordering number less than "n" and before all children with an ordering number greater than "n". Such a format of an ordering number is useful when the number of children is changing during a refresh period.

Figure 3:
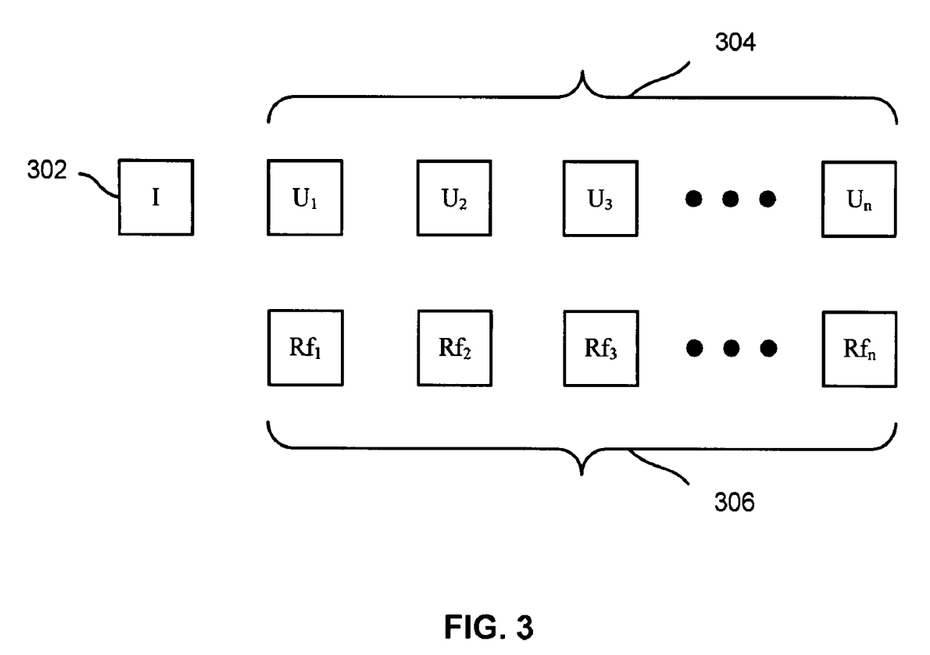
FIG. 3 illustrates an embodiment of a manner for transmitting data associated with a scene.

FIG. 3 illustrates an embodiment of a manner for transmitting data associated with a scene. As depicted, transmission of the scene begins with an initial scene 302, after which an update stream 304 and refresh stream 306 are transmitted. Updates in the update stream dynamically change (i.e. update) the content of a scene at a client, and refresh fragments in the refresh stream may be used, if needed, to refresh the scene at the client, e.g., during error recovery or tune-in. The update stream and refresh stream may be transmitted as separate streams, possibly with different data rates. Alternatively, update and refresh packets may be multiplexed into a single stream. The refresh stream or refresh packets may be continuously provided by an associated server but in some cases received and/or decoded at a client only when needed. Alternatively, the refresh stream or refresh packets are only provided to a client when requested from an associated server.

During a refresh or build of a scene from a series of refresh fragments, updates to one or more nodes may be continued to be applied if the nodes are available at the client. In some embodiments, error processing is disabled during a refresh of a scene so that an error state is not entered when an update can not be applied because a node is not yet available. In some embodiments, such a missed update for a node that has not yet been received may not need to be applied at the client once the node is received since each node included in a refresh fragment includes all cumulative updates associated with the node until the point in time the refresh fragment is transmitted. Once an entire scene has been built or refreshed at a client, it reflects the current state of the scene, and, thereafter, normal update and/or error processing can be performed with respect to the scene.

In some embodiments, a plurality of consecutive refresh fragments included in a refresh stream may be employed to build a scene from scratch at a client, for example, during initial tune-in. In other embodiments, one or more refresh fragments included in a refresh stream may be used with a current state of a scene at a client, for example, to recover from an error state. In such cases, for example, recovery may be commenced from the last error-free state of the scene.

Alternatively, in some embodiments, a scene may be built from scratch whenever a refresh of the scene is needed at a client.

In some embodiments, the refresh distance is static for a particular scene and corresponds to the number of consecutive refresh fragments needed to fully refresh or build the scene. Since refresh fragments are continuously supplied in a refresh stream such as refresh stream 306 of FIG. 3, a refresh of a scene can be commenced at any instance in time and is guaranteed once the number of consecutive refresh fragments specified by the refresh distance are received. The refresh distance associated with a refresh stream may be specified with each refresh fragment to inform a client of the number of consecutive refresh fragments that need to be accumulated to obtain a full refresh. Depending on the order in which nodes are transmitted in refresh fragments, however, a full refresh of a scene may be possible at a client with a number of consecutive refresh fragments that is less than a prescribed static refresh distance. Thus, in some embodiments, instead of a static refresh distance, each refresh fragment includes a number that indicates to a client the number of subsequent consecutive refresh fragments needed to complete a full refresh of a scene. In such cases, the number of refresh fragments needed for a full refresh may vary and depend on the refresh fragment with which the refresh is commenced.

In some embodiments, a refresh fragment may not include all of the data associated with one or more nodes included in the refresh fragment, i.e. the data associated with a refresh fragment may be incomplete. In some such cases, for example, a refresh fragment may include in place of a node or in place of at least some of the data associated with a node one or more forward pointers to data included in one or more subsequent updates. In such cases, each forward pointer included in a refresh fragment needs to be replaced by corresponding data supplied in one or more updates in order for the refresh fragment to be complete. In other cases, for example, a refresh fragment may include in place of a node or in place of at least some of the data associated with a node one or more placeholders. In such cases, each placeholder included in a refresh fragment needs to be replaced via update processing by corresponding data supplied in one or more updates in order for the refresh fragment to be complete. Reductions in the bandwidth needed to transmit a refresh stream can be achieved in many cases by employing forward pointers and/or placeholders for data associated with one or more nodes included in a refresh fragment that is/are to be modified by one or more subsequent updates provided in an update stream within a period of time acceptable for error recovery or tune-in. Thus, in some embodiments, using forward pointers and/or placeholders allows some of the benefits of DRAP and/or RRAP to be realized without consuming the excessive bandwidth required to periodically transmit a refresh of the entire static portion of the scene as in normal DRAP and RRAP. In the cases in which the refresh fragments of a refresh stream may include forward pointers and/or placeholders, in some embodiments, in addition to a refresh distance, an update distance that specifies the number of updates needed to complete a full refresh (i.e. replace all forward pointers and/or placeholders with actual data) is also specified with, for example, each refresh fragment. In various embodiments, such an update distance may be static for all refresh fragments of a refresh stream or may be variable and dependent on a refresh fragment.

Figure 4:
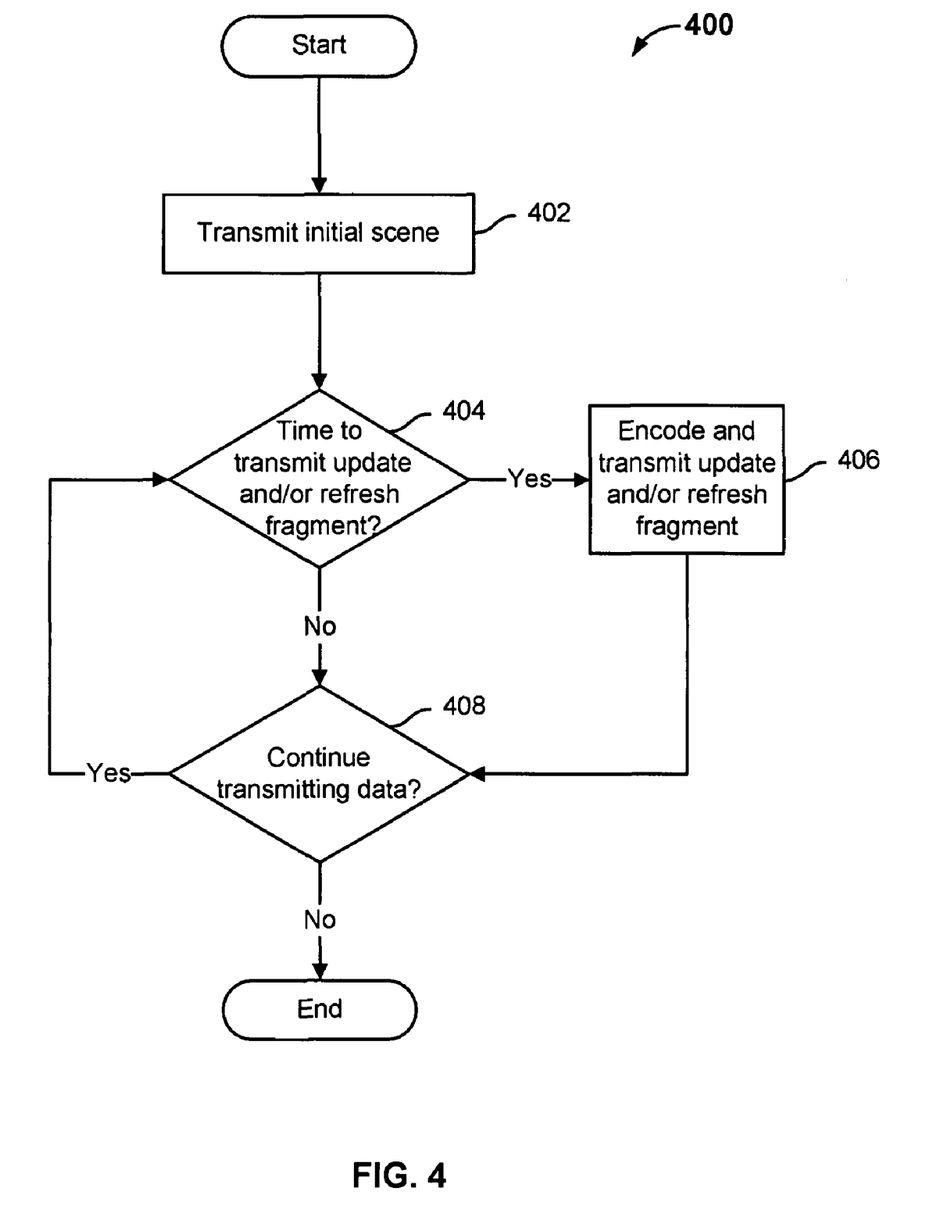
FIG. 4 illustrates an embodiment of a process for transmitting a scene.

FIG. 4 illustrates an embodiment of a process for transmitting a scene. In some embodiments, process 400 is employed by a server, such as server 102 of FIG. 1, to encode and transmit data associated with a scene. Process 400 begins at 402 at which an initial scene is transmitted. At 404, it is determined whether it is time to transmit an update and/or refresh fragment. If it is determined at 404 to transmit an update and/or refresh fragment, at 406 the update and/or refresh fragment is/are encoded and transmitted. In various embodiments, updates and refresh fragments may be transmitted on the same or separate data streams. In some embodiments, a current state of a node is included in a refresh fragment, i.e. the state achieved after application of all associated updates to date, if any, to an initial state of the node. In some embodiments, a refresh fragment includes one or more forward pointers and/or placeholders with respect to one or more nodes that are to be replaced by actual data from one or more subsequent updates. In various embodiments, a refresh fragment may include a specification of a static or variable refresh distance and/or update distance (e.g., if the refresh fragment includes one or more forward pointers and/or placeholders that need to be replaced by corresponding data in one or more updates). The selection of nodes of a scene to be included in a particular refresh fragment may be based at least in part on the ages of the included nodes (and possibly also the ages of other nodes comprising the scene), a guaranteed refresh distance and/or update distance for constructing the scene at a client, etc. In the cases in which a refresh fragment is transmitted at 406, the ages of the nodes comprising a scene are updated. For example, the age of each node included in the refresh fragment is reset to one, and the ages of all other nodes of the scene are incremented by one. In some embodiments, an update transmitted at 406 includes adding one or more nodes to a scene. In such cases, the added nodes are assigned the ages of their immediate parent nodes. If it is determined at 404 that it is not time to transmit an update and/or refresh fragment or upon transmitting an update and/or refresh fragment at 406, it is determined at 408 whether to continue transmitting data associated with the scene. If it is determined at 408 to continue transmitting data associated with the scene, process 400 continues with 404. If it is determined at 408 not to continue transmitting data associated with the scene, process 400 ends.

Figure 5:
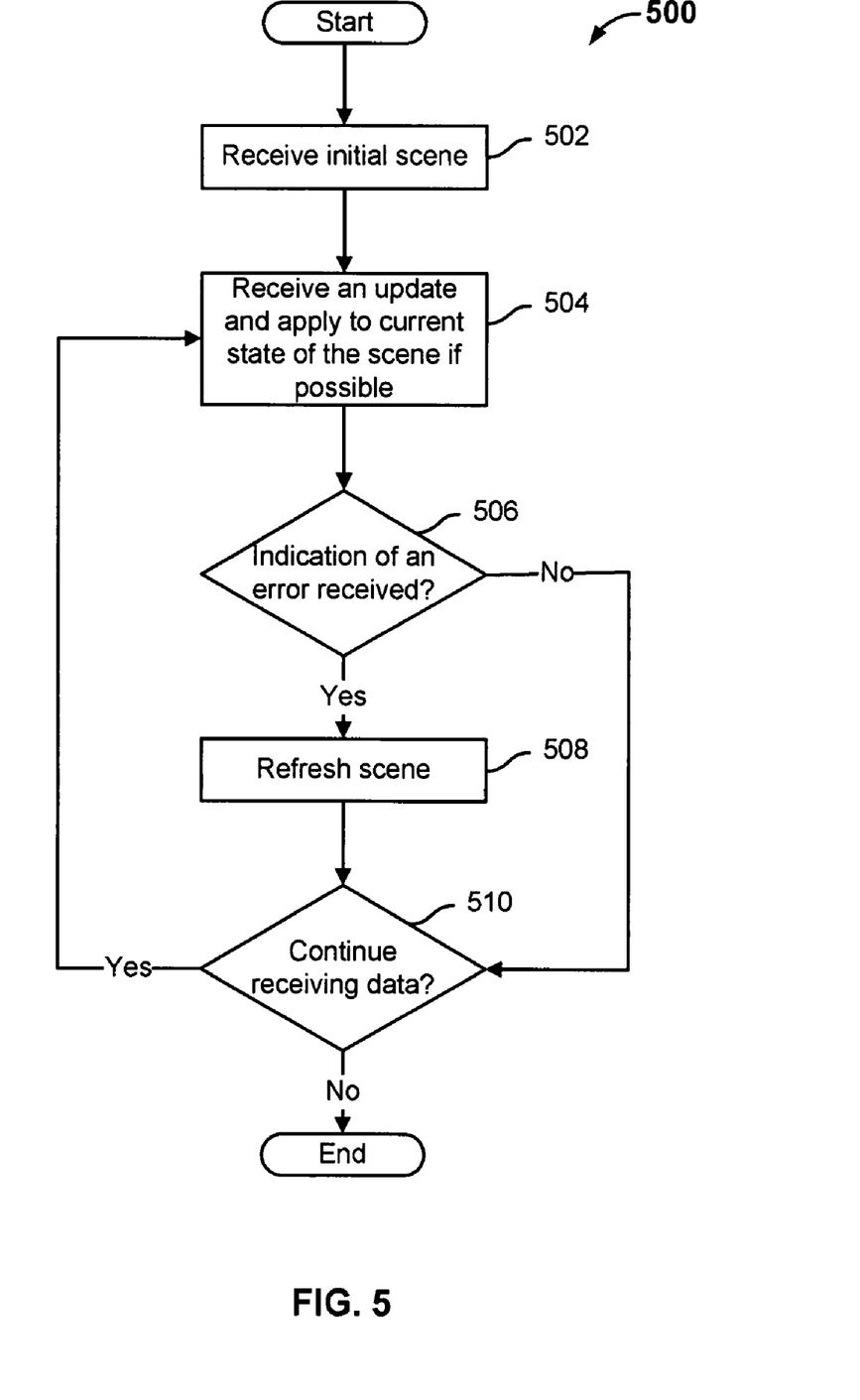
FIG. 5 illustrates an embodiment of a process for receiving a scene.

FIG. 5 illustrates an embodiment of a process for receiving a scene. In some embodiments, process 500 is employed by a client, such as client 104 of FIG. 1, to receive and decode data associated with a scene. Process 500 starts at 502 at which an initial scene is received. At 504 an update for the scene is received and applied to the current state of the scene if possible. At 506 it is determined whether an indication of an error has been received. For example, an error state may be entered when one or more updates are not received, for instance, due to a "lossy" communication channel (i.e., a channel that sometimes drops or otherwise fails to deliver a part of a data stream, e.g., an IP network). If it is determined at 506 that an indication of an error has been received, the current state of the scene is obtained by refreshing the scene, or at least the portions of the scene in error, at 508. A refresh stream for reconstructing a scene may be made available from or may be requested from the server supplying the scene. In various embodiments, refresh packets may be received on the same data stream as update packets or may be received via a separate data stream. In some such cases, one or more refresh packets may be decoded only when a refresh is needed, such as at 508. In some embodiments, while a scene is being refreshed at 508, updates to the scene are continued to be received and applied to the scene to the extent possible. However, during a refresh, it may not be possible to apply all received updates, for example, if one or more associated nodes have not yet been received. In order to prevent entry into a new error state due to the failure of being able to apply an update, in some embodiments, error processing is temporarily disabled until a full refresh has been achieved. In some embodiments, the refresh distance and/or update distance (e.g., if a refresh fragment includes one or more forward pointers and/or placeholders that need to be replaced by corresponding data in one or more updates) associated with fully refreshing a scene is/are determined from one or more received refresh packets or fragments. A full refresh of the scene can be achieved once the requisite number of consecutive refresh fragments and/or updates have been received. In various embodiments, during a refresh, a scene may be rendered at a client once it is completely refreshed or may be rendered to the extent possible while it is being refreshed. After refreshing the scene at 508 or if it is determined at 506 that an indication of an error has not been received, it is determined at 510 whether to continue receiving data associated with the scene. If it is determined at 510 to continue receiving data associated with the scene, process 500 continues with 504. If it is determined at 510 not to continue receiving data associated with the scene, process 500 ends.

Process 500 may be employed for receiving a scene and recovering from an error state, if necessary. In the cases in which a client tunes-in to a scene at a random access point while the scene is in progress, a refresh of the scene is first obtained such as described with respect to step 508 of process 500. After obtaining the current state of the scene, regular update and/or error processing can be subsequently performed. For the case of random tune-in, step 502 of process 500 is modified. Since an initial scene can not be received at 502 since the scene is already in progress, the scene is instead refreshed at 502 as described with respect to step 508. Once the current state of the scene is obtained at 502, process 500 continues at 504 as described above with regular update and/or error processing.

Figure 6:
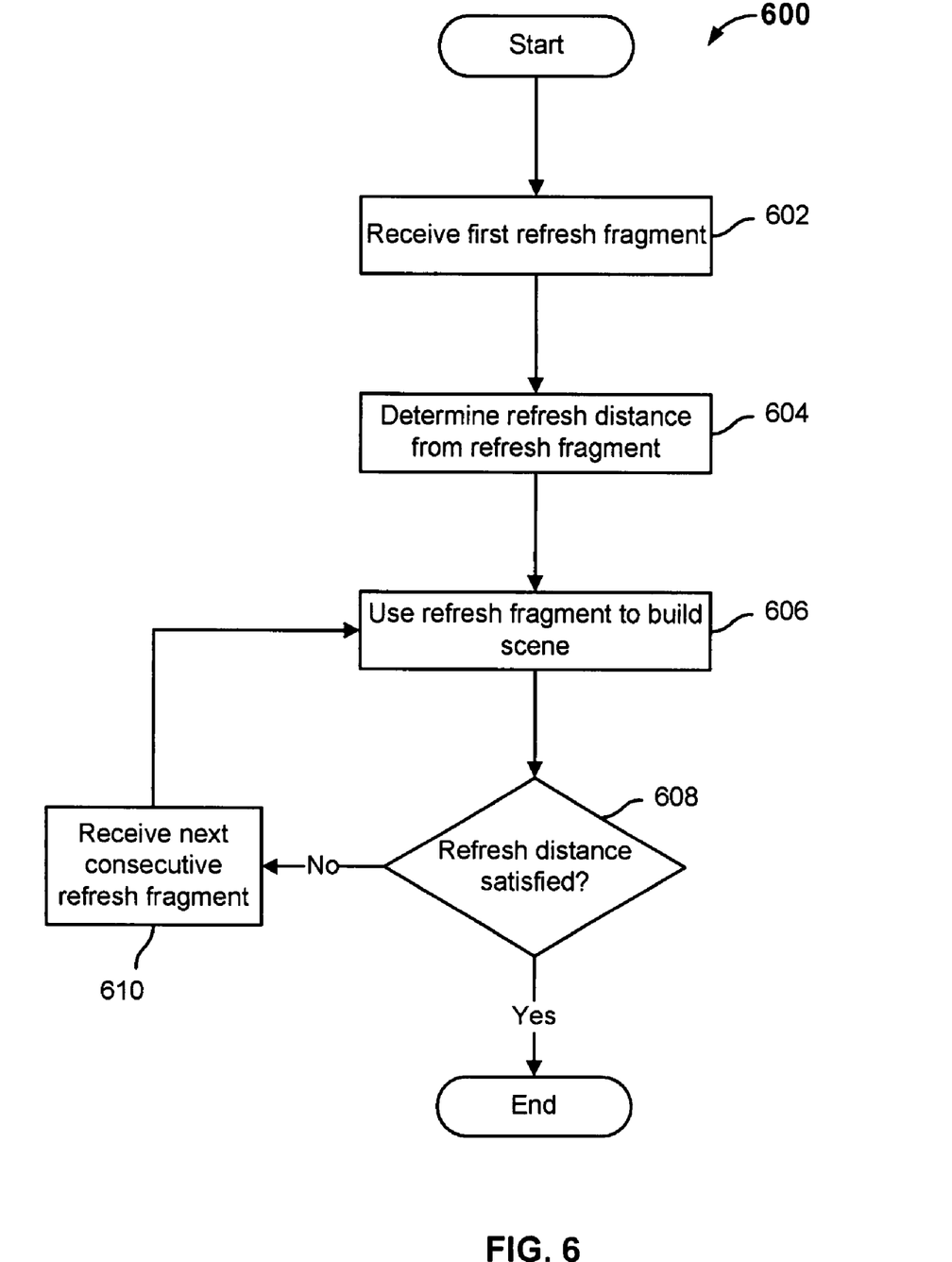
FIG. 6 illustrates an embodiment of a process for refreshing a scene.

FIG. 6 illustrates an embodiment of a process for refreshing a scene. In some embodiments, process 600 is employed by a client, such as client 104 of FIG. 1, to refresh a scene when recovering from an error and/or when tuning-in while a scene is in progress. Process 600 starts at 602 at which a first refresh fragment is received. In various embodiments, refresh fragments may be received on the same data stream as updates or may be received via a separate data stream. Refresh fragments may be made available by or requested from the server supplying the scene. At 604, the refresh distance associated with fully refreshing the scene is determined from the refresh fragment received at 602. In various embodiments, the refresh distance may be static across all refresh fragments or may be variable and depend on the refresh fragment received at 602. At 606, the refresh fragment is used to build a refresh of the scene. In some embodiments, the first refresh fragment received at 602 is employed at 606 to instantiate an object tree associated with the scene. At 608 it is determined whether the refresh distance determined at 604 has been satisfied. That is, it is determined at 608 whether the number of consecutive refresh fragments indicated by the refresh distance determined at 604 have been received and processed. If it is determined at 608 that the refresh distance has not been satisfied, the next consecutive refresh fragment is received at 610, and process 600 subsequently continues at 606. If it is determined at 608 that the refresh distance has been satisfied, process 600 ends. In some embodiments, updates are applied as applicable during process 600. In such cases, update processing depends on the current state of the scene during the refresh since updates can only be applied to nodes of the scene that are available. In some such cases, error processing is temporarily disabled while a scene is being refreshed so that an error state is not entered when an update is not able to be applied because a corresponding node is not yet available.

In the cases in which refresh fragments may include forward pointers and/or placeholders to data included in one or more updates, process 600 includes the requisite update processing. In such cases, for example, 602 includes receiving the current update, if available; 604 includes determining an update distance; 606 includes applying received updates to the current state of the scene to the extent possible; 608 includes determining whether an update distance has been satisfied; and/or 610 includes receiving the next update. Thus, update processing may be performed in parallel while refreshing a scene. Alternatively, refresh and update processing may be sequentially performed.

The techniques described herein may be employed to efficiently provide a refresh of a scene. Relatively little bandwidth is needed to provide the nodes comprising a scene in a continuous stream of refresh fragments. Further reductions in bandwidth can be achieved by including forward pointers and/or placeholders in refresh fragments which are subsequently resolved by one or more updates. In addition, the techniques described herein provide continuous random access points at which a refresh can be commenced.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing a refresh of an entire scene, comprising:
dividing a scene into a plurality of fragments, wherein each fragment comprises fewer than all of a hierarchical set of nodes comprising the scene and provides less than a complete structure of the scene; and
transmitting in a continuous refresh stream successive fragments comprising the plurality of fragments;
wherein each node in the scene is periodically transmitted such that the nodes included in a prescribed number of consecutive fragments starting from any point in the continuous refresh stream provides sufficient data to refresh the entire scene;
wherein each node is associated with an age and the prescribed number comprises a maximum allowable age of a node.

2. A method as recited in claim 1, wherein each node comprises an object.

3. A method as recited in claim 1, wherein each fragment includes a parent node of each node included in the fragment.

4. A method as recited in claim 1, wherein each fragment includes a root node.

5. A method as recited in claim 1, wherein an age of a node specifies a number of fragments that have been transmitted in the refresh stream since the node was last transmitted in a fragment.

6. A method as recited in claim 1, wherein an age of a node is reset when the node is transmitted in a fragment.

7. A method as recited in claim 1, wherein an age of a node is incremented when the node is not transmitted in a fragment.

8. A method as recited in claim 1, wherein the prescribed number is static for the refresh stream.

9. A method as recited in claim 1, wherein the prescribed number is variable and depends on a starting fragment with respect to which a refresh is commenced.

10. A method as recited in claim 1, wherein each fragment includes a number comprising the prescribed number of consecutive fragments that are sufficient to refresh the scene.

11. A method as recited in claim 1, further comprising transmitting in an update stream one or more updates.

12. A method as recited in claim 11, wherein an update includes one or more of:
instructions to add one or more nodes, instructions to delete one or more nodes, instructions to replace one or more nodes, and instructions to change one or more attribute values.

13. A method as recited in claim 11, wherein the update stream and the refresh stream are parts of a single stream.

14. A method as recited in claim 11, wherein the update stream and the refresh stream are different streams.

15. A method as recited in claim 11, wherein an update includes adding one or more nodes and wherein each of the one or more nodes is assigned an age of an immediate parent of the node.

16. A method as recited in claim 1, wherein a fragment includes one or more forward pointers.

17. A method as recited in claim 16, wherein the one or more forward pointers are replaced by data included in one or more updates.

18. A method as recited in claim 1, wherein a fragment includes one or more placeholders.

19. A method as recited in claim 18, wherein the one or more placeholders are replaced by data included in one or more updates.

20. A method as recited in claim 1, wherein a prescribed number of consecutive updates is needed to refresh the scene.

21. A method as recited in claim 20, wherein the prescribed number of consecutive updates is static for the refresh stream.

22. A method as recited in claim 20, wherein the prescribed number of consecutive updates is variable and depends on a starting fragment with respect to which a refresh is commenced.

23. A method as recited in claim 20, wherein each fragment includes a number comprising the prescribed number of consecutive updates needed to refresh the scene.

24. A method as recited in claim 1, wherein the nodes included in one or more fragments of the plurality of fragments evolve over time.

25. A method as recited in claim 1, wherein the plurality of fragments are of approximately the same size.

26. A method as recited in claim 1, wherein the scene comprises a Scalable Vector Graphics scene.

27. A method for refreshing an entire scene, comprising:
receiving a continuous refresh stream comprising successive fragments, wherein each fragment comprises fewer than all of a hierarchical set of nodes comprising a scene and provides less than a complete structure of the scene; and
refreshing the entire scene using a prescribed number of consecutive fragments;
wherein each node in the scene is periodically transmitted such that the nodes included in the prescribed number of consecutive fragments starting from any point in the continuous refresh stream provide sufficient data to refresh the entire scene;
wherein each node is associated with an age and the prescribed number comprises a maximum allowable age of a node.

28. A method as recited in claim 27, further comprising processing one or more updates to an extent possible.

29. A method as recited in claim 27, further comprising temporarily disabling error processing.

30. A method as recited in claim 27, further comprising rendering the scene while the scene is being refreshed.

31. A method as recited in claim 27, further comprising rendering the scene after the scene is completely refreshed.

32. A system for providing a refresh of an entire scene, comprising:
a processor configured to:
divide a scene into a plurality of fragments, wherein each fragment comprises fewer than all of a hierarchical set of nodes comprising the scene and provides less than a complete structure of the scene; and
transmit in a continuous refresh stream successive fragments comprising the plurality of fragments;
wherein each node in the scene is periodically transmitted such that the nodes included in a prescribed number of consecutive fragments starting from any point in the continuous refresh stream provides sufficient data to refresh the entire scene;
wherein each node is associated with an age and the prescribed number comprises a maximum allowable age of a node; and
a memory coupled to the processor and configured to provide instructions to the processor.

33. A system for refreshing an entire scene, comprising:
a processor configured to:
receive a continuous refresh stream comprising successive fragments, wherein each fragment comprises fewer than all of a hierarchical set of nodes comprising a scene and provides less than a complete structure of the scene; and
refresh the entire scene using a prescribed number of consecutive fragments;
wherein each node in the scene is periodically transmitted such that the nodes included in the prescribed number of consecutive fragments starting from any point in the continuous refresh stream provide sufficient data to refresh the entire scene;
wherein each node is associated with an age and the prescribed number comprises a maximum allowable age of a node; and
a memory coupled to the processor and configured to provide instructions to the processor.

34. A computer program product for providing a refresh of an entire scene, the computer program product being embodied in a non-transitory computer readable medium and comprising computer instructions for:
dividing a scene into a plurality of fragments, wherein each fragment comprises fewer than all of a hierarchical set of nodes comprising the scene and provides less than a complete structure of the scene; and
transmitting in a continuous refresh stream successive fragments comprising the plurality of fragments;
wherein each node in the scene is periodically transmitted such that the nodes included in a prescribed number of consecutive fragments starting from any point in the continuous refresh stream provides sufficient data to refresh the entire scene;
wherein each node is associated with an age and the prescribed number comprises a maximum allowable age of a node.

35. A computer program product as recited in claim 34, wherein each node comprises an object.

36. A computer program product as recited in claim 34, wherein each fragment includes a parent node of each node included in the fragment.

37. A computer program product as recited in claim 34, wherein a fragment includes one or more forward pointers to data included in one or more updates.

38. A computer program product as recited in claim 34, wherein a fragment includes one or more placeholders for data included in one or more updates.

39. A computer program product as recited in claim 34, wherein a prescribed number of consecutive updates is needed to refresh the scene.

40. A computer program product as recited in claim 34, wherein the nodes included in one or more fragments of the plurality of fragments evolve over time.

41. A computer program product as recited in claim 34, wherein the scene comprises a Scalable Vector Graphics scene.

42. A computer program product for refreshing an entire scene, the computer program product being embodied in a non-transitory computer readable medium and comprising computer instructions for:
- receiving a continuous refresh stream comprising successive fragments, wherein each fragment comprises fewer than all of a hierarchical set of nodes comprising a scene and provides less than a complete structure of the scene; and
- refreshing the entire scene using a prescribed number of consecutive fragments;
- wherein each node in the scene is periodically transmitted such that the nodes included in the prescribed number of consecutive fragments starting from any point in the continuous refresh stream provide sufficient data to refresh the entire scene;
- wherein each node is associated with an age and the prescribed number comprises a maximum allowable age of a node.

43. In a graphics processing system, a method of building an object model for an entire scene to be displayed from update packages and refresh packages received in a continuous refresh stream from a source, the method comprising:
- a) reading a first refresh package comprising at least one refresh fragment to determine whether it identifies update packages, each comprising at least one update fragment and later-received refresh packages in which further definitions of the object model are to be found,
- b) reading at least a partial definition of the object model from the first refresh package,
- c) reading other at least partial object model definitions respectively from the update packages identified in the first refresh package,
- d) reading other at least partial object model definitions respectively from the other refresh packages identified in the first refresh package, and
- e) building a complete object model for an entire scene from the model definitions read according to the foregoing steps b through d;
- wherein each node in the scene is periodically transmitted such that the nodes included in a prescribed number of consecutive fragments starting from any point in the continuous refresh stream provide sufficient data to refresh the entire scene;
- wherein each node is associated with an age and the prescribed number comprises a maximum allowable age of a node.

44. The method of claim 43, wherein the other refresh packages are identified by a refresh distance value.

45. The method of claim 43, wherein the other update packages are identified by forward pointers.

46. The method of claim 43, wherein the graphics processing system marks the object model as complete as of a display time of the latest of the first refresh package and the update packages and the other refresh packages pointed to by the first refresh package.

47. The method of claim 43, further comprising updating the object model solely by definition updates provided in later-received update packages so long as reliable communications are maintained with the source.

48. The method of claim 47, further comprising, if reliable communication with the source is lost and later regained, repeating steps a-e to build a new object model using a refresh package received after communication is regained as the first refresh package.

49. In a graphics processing system, a method of building an object model for an entire scene to be displayed from update packages and refresh packages received in a continuous refresh stream from a source, the method comprising:
- a) reading a first refresh package comprising at least one refresh fragment to determine whether it contains pointers to later-received update packages, each comprising at least one update fragment, and later-received refresh packages in which elements of the object model are to be found,
- b) reading at least a partial definition of the object model from the first refresh package,
- c) if pointers to update packages are identified, reading other at least partial object model definitions respectively from the update packages so identified,
- d) if a pointer to other refresh packages is identified, reading other at least partial object model definitions respectively from the other refresh packages so identified, and
- e) building a complete object model for an entire scene from the model definitions read according to the foregoing steps b through d;
- wherein each node in the scene is periodically transmitted such that the nodes included in a prescribed number of consecutive fragments starting from any point in the continuous refresh stream provide sufficient data to refresh the entire scene;
- wherein each node is associated with an age and the prescribed number comprises a maximum allowable age of a node.

50. The method of claim 49, wherein the pointer to the other refresh packages is a refresh distance value.

51. In a graphics processing system, a method for building an object model of an entire scene to be displayed, the method comprising:
- if an initial scene is not available, reading data of a first refresh package received in a continuous refresh stream, the refresh package including at least a refresh distance identifier representing a number of refresh packages that may be necessary to read before a full object model for an entire scene can be constructed and at least a partial definition of the object model and comprising at least one refresh fragment,
- reading a number of subsequent refresh packages to cover the refresh distance,
- for each subsequent refresh package, determining whether the respective object model definition includes pointers to any other refresh packages or to any update packages, each update package comprising at least one update fragment,
- if pointers to update packages exist, reading at least partial object model definitions from the respective update package, and building the object model from the object model definitions provided in the refresh packages and any updates referenced by the refresh packages, the object models being valid as of the latest time from among the refresh packages and the update packages referenced therein;

wherein each node in the scene is periodically transmitted such that the nodes included in a prescribed number of consecutive fragments starting from any point in the continuous refresh stream provide sufficient data to refresh the entire scene;

wherein each node is associated with an age and the prescribed number comprises a maximum allowable age of a node.

52. A method for providing a refresh of an entire scene, comprising:

dividing a scene into a plurality of fragments, wherein each fragment comprises fewer than all of a hierarchical set of nodes comprising the scene and provides less than a complete structure of the scene; and transmitting in a refresh stream successive fragments comprising the plurality of fragments;

wherein each node in the scene is periodically transmitted such that the nodes included in a prescribed number of consecutive fragments starting from any point in the refresh stream provides sufficient data to refresh the entire scene;

wherein each node is associated with an age and the prescribed number comprises a maximum allowable age of a node wherein the prescribed number of consecutive fragments comprise a subset of the refresh stream.

* * * * *